United States Patent [19]

Toncelli

[11] Patent Number: 4,698,010

[45] Date of Patent: Oct. 6, 1987

[54] PROCESS FOR THE FORMATION OF BLOCKS OF ANY MATERIAL BY MEANS OF THE CONTEMPORANEOUS ACTION OF VIBRATIONS, COMPRESSION AND VACUUM INTENDED FOR CUTTING INTO SLABS AND APPARATUS ADAPTED TO CARRY OUT THE SAID PROCESS

[76] Inventor: Marcello Toncelli, Via Giovanni XXIII, 2, Bassano Del Grappa, Vicenza, Italy

[21] Appl. No.: 754,235

[22] Filed: Jul. 12, 1985

[30] Foreign Application Priority Data

Sep. 14, 1984 [IT] Italy .................................. 85632 A/84

[51] Int. Cl.4 .................. A01J 17/00; A01J 21/00; B29C 41/22
[52] U.S. Cl. .................................. 425/200; 425/335; 425/347; 425/412; 425/421; 264/71; 264/73; 264/77; 264/85; 156/61
[58] Field of Search .................. 264/71, 73, 77, 85; 425/253, 335, 256, 347, 405 R, 406, 412, 420, 421, 424, 447, 448, 456, 815; 156/61

[56] References Cited

U.S. PATENT DOCUMENTS

| | | | |
|---|---|---|---|
| 2,605,531 | 8/1952 | McElroy | 25/11 |
| 2,859,502 | 11/1958 | Brown, Jr. | 25/41 |
| 3,006,053 | 10/1961 | Miller | 25/41 |
| 3,712,785 | 1/1973 | Hirt et al. | 425/405 |
| 4,092,393 | 5/1978 | Marocco | 264/102 |
| 4,105,729 | 8/1978 | Helmrich et al. | 264/71 |
| 4,373,885 | 2/1983 | Smyth | 425/129 R |
| 4,417,864 | 11/1983 | Shigeo et al. | 425/73 |
| 4,466,853 | 8/1984 | Hartmann et al. | 156/381 |
| 4,473,673 | 9/1984 | Williams et al. | 523/318 |
| 4,515,629 | 5/1985 | Dizek et al. | 75/0.5 B |
| 4,522,772 | 6/1985 | Beran | 264/71 |
| 4,544,345 | 10/1985 | Buhler et al. | 425/405 R |
| 4,551,085 | 11/1985 | Epel et al. | 425/405 R |

FOREIGN PATENT DOCUMENTS

| | | |
|---|---|---|
| 82540 | 9/1975 | Italy . |
| 85564 | 4/1977 | Italy . |
| 85558 | 5/1981 | Italy . |
| 25270 | 10/1906 | Sweden .................................. 264/77 |

Primary Examiner—John E. Kittle
Assistant Examiner—Patrick J. Ryan
Attorney, Agent, or Firm—Bucknam and Archer

[57] ABSTRACT

The process, conducted completely under vacuum, provides that a material of any kind (marble, stone or material of other nature) of variable particle size is introduced, together with a binder (organic or inorganic) into a mixer (2) and then, after having achieved the complete homogeneity of the mixture, is discharged in a convenient manner into a mouldbox (1) which is then transferred to the interior of a press (6) where the beam (8), provided with vibrators (10), subjects it to a combined action of pressure and vibration of the mass which the mixture in volume to result in blocks suitable to be cut into slabs or into blocks of lesser dimensions according to need.

4 Claims, 2 Drawing Figures

PROCESS FOR THE FORMATION OF BLOCKS OF ANY MATERIAL BY MEANS OF THE CONTEMPORANEOUS ACTION OF VIBRATIONS, COMPRESSION AND VACUUM INTENDED FOR CUTTING INTO SLABS AND APPARATUS ADAPTED TO CARRY OUT THE SAID PROCESS

BACKGROUND OF THE INVENTION

With the process according to the invention there is obtained the production of compacted blocks starting from any material (marble, stone and other materials of various kinds) and a binder in the most suitable proportions, intended to be cut into slabs or into blocks of smaller dimensions for employment in building construction.

The current state of the art can be summarised in the Italian Patent No. 82540/A/75 filed by the same applicant on 5th Sept. 1975 and improved in the first addition No. 85564/A/77 filed 22nd Apr. 1977 and in the patent No. 85558/A/81 filed by the same applicant on 7th May 1981.

In the first patent recited above and in the improvement described in the first addition there is set forth a process with combined action of vibration and pressure in an ambiance deprived of air for the formation of granulates of stone material bound with resin.

Said process requires the use of fragmented stone material controlled within a restricted range (max. 4 mm.), a combined action of vibration and pressure in an ambiance deprived of air in order to obtain a condensing of the material itself and subsequently a catalysis by heat of the resin by suitable provided means.

In the third patent mentioned above, there are obtained blocks of considerable dimensions (as large as 305×125×80 cm) using granules of marble of particle size as large as 200 mm. The material of controlled particle size is deposited, in the presence of air, in a mould together with the binder mixture coming from a suitable mixing machine. The mould filled in this manner is introduced into a moulding machine wherein there is complete de-aeration and compacting of the materials under vibration, until there is complete formation of the block. The block made in this manner is usually left to rest in a natural ambiance, or is introduced into ovens for the catalysis by heat of the resin.

These two processes have some inconveniences and in particular:

(1) the first one, with its improvement, requiring very small particles (max.4 mm) needs a process of fragmentation and sieving of the stone material, thereby increasing the time for preparation. As the granules are very small there is required a large quantity of binder because the ratio of volume to surface area is small and thus the total area to be covered is very large.

(2) the second one, eliminating the inconveniences of the first one, does not present any others of great importance. The mixing and the compacting in the mould take place in open air, thereby favouring the formation of voids in the material which are difficult to diliminate solely by vibration in an ambiance deprived of air.

With the present invention it is sought to eliminate the above-mentioned inconveniences and there is therefore proposed a plant capable of producing blocks of considerable dimensions (up to 305×125×80 cm) using any materials of particle size up to 200 mm. together with powders and granules of the said materials.

SUMMARY OF THE INVENTION

To obtain such results it is therefore necessary to take account of new features of the machine and of the product, which differ considerably from the preceding ones.

In the first place, the pieces of large dimensions render practically impossible their own migration within the body of the paste. This indicates that they must be deposited, by an automatic process, in the mould with the same positioning in the plant that they will have at the end of the operation. In the second place, they must be brought closer to each other, in vertical direction, by means of an energetic pressing action.

It is evident that in this phase of the operation there will be produced between the various elements of material of various particle sizes (the major part of which are of considerable dimensions) considerable forces of attrition.

To render such forces acceptable it is then necessary, during the pressing operation, to induce an energetic vibration within the mixture itself.

For the purpose of increasing the value of the alternating force transmitted by the beam provided with mechanical vibrators, and to render possible the propagation of the vibrations in the whole of the mass of the mixture in operation, it is necessary that this mass should have a sufficient rigidity.

Such rigidity must be guaranteed by the maximum possible quantity of the granules of various sizes, by the minimum quantity possible of the binder, and by the absolute absence of pockets of air in the body of the mass itself.

At the end of the operation, the block which is obtained must be completely devoid of voids in the materials.

The major advantages which are obtained with this new process are:

(1) Considerable saving of binder
(2) Better quality of product which contains a major quantity of natural element;
(3) Possibility of forming blocks of considerable dimensions with these features;
(4) Possibility of utilising any materials of various particle size and characteristics and therefore using all the products of fragmentation.

The entire process should be carried out in an ambiance deprived of air, thereby eliminating any possibility of including air in the product, which will considerably reduce the strength and the quality of the finished product.

The blocks, made in this manner, are then allowed to mature; the maturing is according to the type of binder. In fact the binder can be of organic or inorganic type.

The organic binders, such as for example phenolic resins, melanyl resins, urea resins, epoxy resins, polyester resins, require polymerisation by heat or cold to give the possibility, to the molecules of the binder, of polymerizing amongst themselves; the inorganic binders, such as for example the cements, only require a maturing to permit the various constituents to react amongst themselves.

There will be seen from the following description an apparatus adapted to carry out the process which is the subject of the patent. The patent is intended to extend also to such apparatus.

DESCRIPTION OF THE PREFERRED EMBODIMENT

Figure 1:
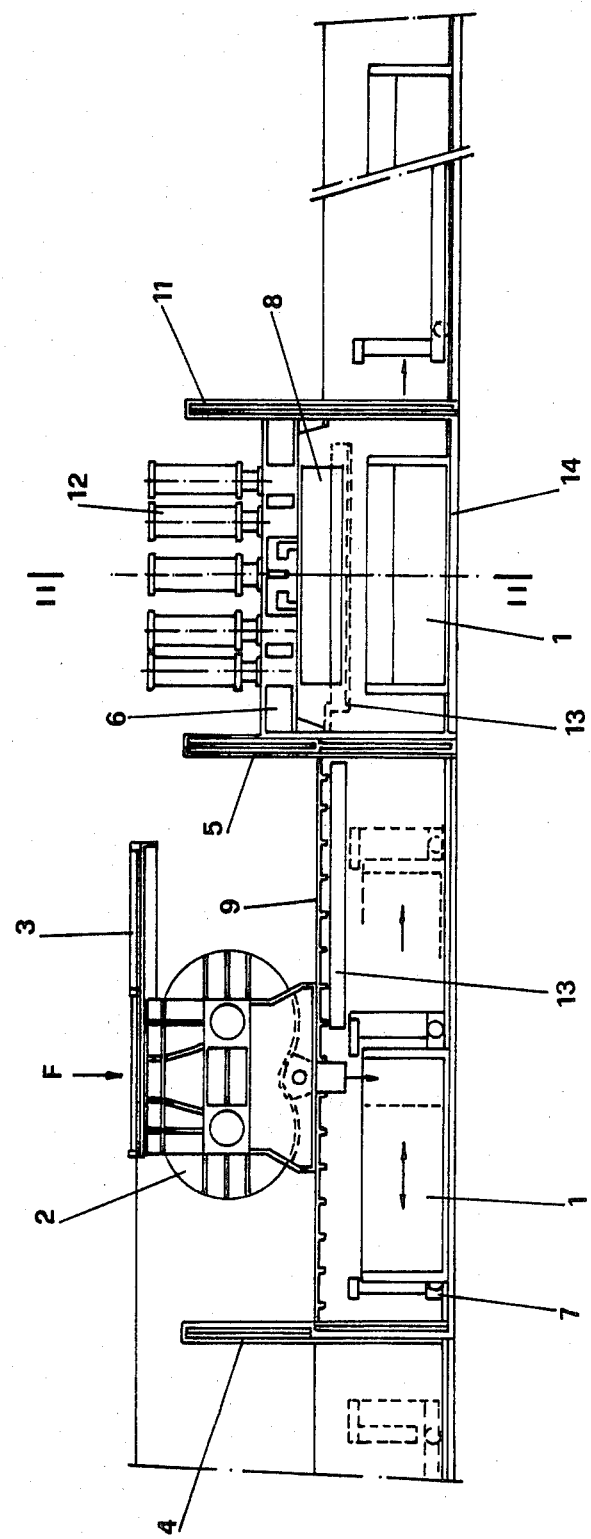
FIG. 1 is a schematic view from the side of the apparatus adapted to carry out the process of the invention.

In FIG. 1 it is possible to see the mixer 2 which rests on and is in communication with the tunnel 9. The blades of the mixer 2 are placed in rotation by means of two reducers, not illustrated in the figure, coupled to a hydraulic motor.

During the phase of discharging of the mixer 2 through the inlet indicated in the figure by the arrow "F", there is introduced into the tunnel 9 the carriage 7 which transports the mould 1. The door 5 is closed in this phase. When the phase of filling of the mixer 2 with a quantity of mixture comprising granules of the material in use, powder of the same and binder, has finished the doors 3 and 4 are closed. There is then created a vacuum in the mixer 2 and in the tunnel 9 by means of a vacuum pump not illustrated.

When the action of the mixer has finished, the mixture is discharged from the discharge opening of the mixer into the mould 1 which is moved in the alternating motion of the carriage 7, as indicated in FIG. 1, until there is obtained a homogenized distribution of the mixture.

At the same time, the door 11 is closed and a vacuum is created in the press 6.

At this point the door 5 is opened and the mould 1, by means of the carriage 7, is introduced into the press 6; after which the door 5 is re-closed. Now the door 4 as well as the door 3 are re-opened in order to permit the introduction of a new mould and initiate the process afresh.

Figure 2:
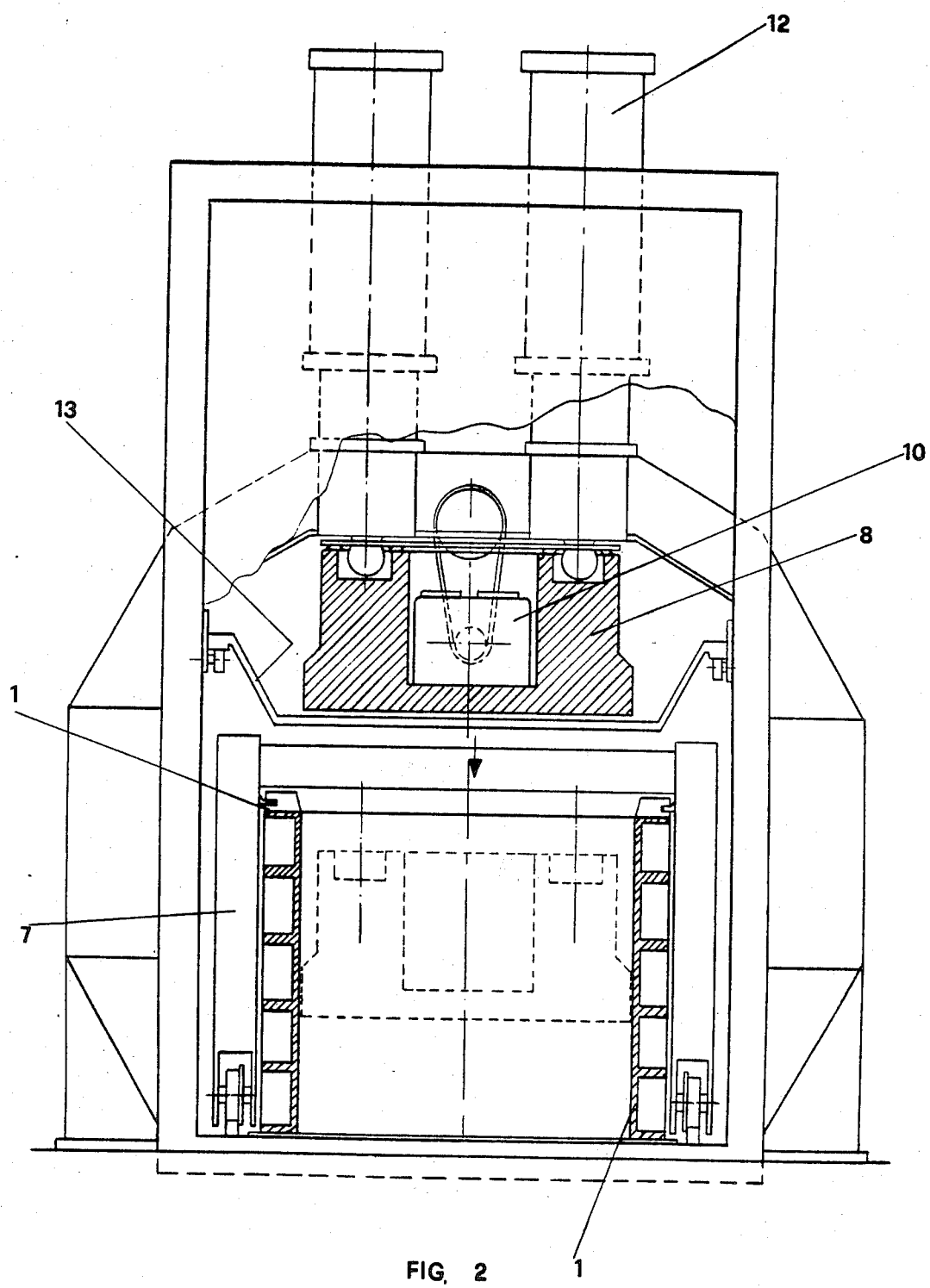
FIG. 2 is a section taken on the line II—II of FIG. 1.

The press 6 in FIG. 2 is constituted essentially of a beam 8 which is lowered under the action of pneumatic cylinders 12, creating in the granular mass a combined action of vibration and pressure, in the presence of an ambiance deprived of air.

Once the combined action of vibration, pressure and vacuum has terminated, the door 11 is opened and the block is transported from the carriage 7, by means of a tray 13 which is positioned beneath the completely raised beam 8 to avoid any residue of material, remaining adherent to the beam, falling onto the bearer plate 14.

The patent is intended to extend also to the apparatus adapted to carry out the process described, an example of which is illustrated in the accompanying sheets of drawings.

It is also intended to extend to the products obtained with said process, in so far as its features are novel relative to the blocks of material produced hitherto.

What is claimed is:

1. A process for the formation of blocks of marble, stone and the like of size up to $305 \times 125 \times 80$ cm from particles of marble, stone and the like of size up to 200 mm by the contemporaneous action of vibration, compression and vacuum which consists of:
   (1) combining said particles with a binder in a mixer to obtain a mixture;
   (2) mechanically mixing said mixture to obtain an homogeneous mixture;
   (3) creating a vacuum in said mixer to obtain an homogeneous mass free of voids;
   (4) discharging said mixture from step 3) into a mold in which a vacuum has also been created and maintaining said mold in motion;
   (5) introducing said mold into a press in which a vacuum has been created;
   (6) simultaneously compressing and vibrating said mixture in said press, by subjecting said mixture to the action of pneumatic cylinders impinging upon a beam which is in direct contact with said mixture; while maintaining the vacuum therein whereby the volume is reduced and blocks with no air voids are formed;
   (7) discharging said blocks from said press and
   (8) allowing the binder to set.

2. An apparatus for the formation of blocks of marble, stone and the like of size up to $305 \times 125 \times 80$ cm from particles of marble, stone and the like of size up to 200 mm by contemporaneous action of vibration, compression and vacuum, said apparatus comprising:
   a mixer for combining said particles with a binder, to obtain a mixture, mechanical means in said mixer for mixing said mixture to obtain an homogeneous mixture, a mold positioned relative to said mixture so as to receive said mixture from said mixer;
   means for creating a vacuum in said mixer and in said mold;
   a carriage connected to said mold for agitating said mold by an alternating motion and a translatory motion alternately;
   a press having an opening for receiving said mold;
   a tunnel for connecting said mold to said press;
   means for maintaining a vacuum in said press;
   means for simultaneously compressing and vibrating said mixture in said press, which comprise a plurality of pneumatic cylinders connected to a beam, means for lowering said beam in contact with said mixture for creating vibrations and pressure on said mixture;
   means for transporting said mold to said tunnel and means for discharging the blocks from said press.

3. The process of claim 1 wherein said binder is cement.

4. The apparatus of claim 2 wherein said mixer comprises a plurality of blades, and a hydraulic motor for rotating said blades.

* * * * *